(12) United States Patent
Hibben

(10) Patent No.: US 9,416,300 B2
(45) Date of Patent: *Aug. 16, 2016

(54) LOW TEMPERATURE CURABLE ADHESIVE COMPOSITIONS

(71) Applicant: Simpson Strong-Tie Company, Inc., Pleasanton, CA (US)

(72) Inventor: Quentin Lewis Hibben, Elburn, IL (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/508,080

(22) Filed: Oct. 7, 2014

(65) Prior Publication Data

US 2015/0020965 A1   Jan. 22, 2015

Related U.S. Application Data

(63) Continuation-in-part of application No. 13/717,144, filed on Dec. 17, 2012, now Pat. No. 8,552,119, which is a continuation of application No. 13/007,635, filed on Jan. 16, 2011, now Pat. No. 8,334,346.

(60) Provisional application No. 61/887,916, filed on Oct. 7, 2013.

(51) Int. Cl.
| | |
|---|---|
| *C09J 135/02* | (2006.01) |
| *C09J 5/04* | (2006.01) |
| *B32B 37/12* | (2006.01) |
| *C08F 230/08* | (2006.01) |
| *C08F 220/10* | (2006.01) |
| *C09J 4/06* | (2006.01) |

(52) U.S. Cl.
CPC ............... *C09J 135/02* (2013.01); *B32B 37/12* (2013.01); *C08F 220/10* (2013.01); *C08F 230/08* (2013.01); *C09J 4/06* (2013.01); *C09J 5/04* (2013.01); *B32B 2037/1253* (2013.01)

(58) Field of Classification Search
None
See application file for complete search history.

(56) References Cited

U.S. PATENT DOCUMENTS

| | | | |
|---|---|---|---|
| 3,558,574 A * | 1/1971 | Doehnert | 428/355 CN |
| 5,064,719 A | 11/1991 | Den Hartog et al. | |
| 5,077,324 A | 12/1991 | Kistner et al. | |
| 5,096,783 A | 3/1992 | Liu et al. | |
| 5,157,072 A | 10/1992 | Hense et al. | |
| 5,288,767 A | 2/1994 | Cramer et al. | |
| 5,643,994 A | 7/1997 | Kish et al. | |
| 6,015,845 A | 1/2000 | Yonetani et al. | |
| 6,037,408 A | 3/2000 | Weber et al. | |
| 6,297,320 B1 | 10/2001 | Tang | |
| 6,583,259 B1 | 6/2003 | Weber et al. | |
| 6,624,243 B2 | 9/2003 | Stark et al. | |
| 7,009,003 B2 | 3/2006 | Cruz | |
| 7,244,793 B2 | 7/2007 | Liu et al. | |
| 7,273,524 B2 | 9/2007 | Tomita et al. | |
| 7,288,147 B2 | 10/2007 | Christensen et al. | |
| 7,544,739 B2 | 6/2009 | Liu et al. | |
| 7,638,563 B2 | 12/2009 | Nishikawa et al. | |
| 7,741,381 B2 | 6/2010 | Nakata et al. | |
| 7,789,149 B2 | 9/2010 | Santra et al. | |
| 8,058,345 B2 | 11/2011 | Liu et al. | |
| 8,313,604 B2 | 11/2012 | Oshima et al. | |
| 8,334,346 B2 * | 12/2012 | Hibben | 525/274 |
| 8,552,119 B2 * | 10/2013 | Hibben | 525/274 |
| 2002/0007009 A1 | 1/2002 | Stark et al. | |
| 2003/0017348 A1 | 1/2003 | Brown | |
| 2004/0063867 A1 | 4/2004 | Cruz | |
| 2005/0250887 A1 | 11/2005 | Yang | |
| 2007/0191521 A1 | 8/2007 | Zhao | |
| 2007/0282046 A1 | 12/2007 | Killilea et al. | |
| 2007/0299180 A1 | 12/2007 | Joecken | |
| 2010/0012263 A1 | 1/2010 | Oshima et al. | |
| 2010/0280198 A1 | 11/2010 | Bartley et al. | |
| 2011/0236612 A1 | 9/2011 | Kumru et al. | |

FOREIGN PATENT DOCUMENTS

| | | |
|---|---|---|
| CN | 1497015 A | 5/2004 |
| CN | 101213225 A | 7/2008 |
| DE | WO88/03599 A1 | 5/1988 |
| EP | 1153979 B2 | 4/2011 |
| WO | WO2010/114119 | 7/2010 |
| WO | PCT/US12/21129 | 8/2012 |

* cited by examiner

Primary Examiner — Robert S Loewe
(74) Attorney, Agent, or Firm — The Firenza Group Ltd.; Sharon R. Kantor

(57) ABSTRACT

The present disclosure is concerned with improved curable adhesive compositions for anchoring elements in a structural body that exhibit low temperature versus standard temperature degree of cures that are at least 50% or higher. The compositions include, in a first portion, a reactive resin, an acetoacetoxy functional monomer and a silane monomer. By using phthalate-free constituents in the formulation, a further 10% increase in strength and durability of the resins at standard temperatures may be realized after curing at low temperatures. Improvements in the adhesive compositions that relate to increased shelf life are also presented.

43 Claims, No Drawings

LOW TEMPERATURE CURABLE ADHESIVE COMPOSITIONS

PRIORITY CLAIM AND CROSS-REFERENCE TO RELATED APPLICATIONS

This application is a Continuation-in-Part of U.S. application Ser. No. 13/717,144, filed 8 Oct. 2013, now U.S. Pat. No. 8,552,119, issued 8 Oct. 2013, which is a Continuation of U.S. application Ser. No. 13/007,635, filed 16 Jan. 2011, now U.S. Pat. No. 8,334,346, issued 18 Dec. 2012, and claims priority from U.S. provisional application Ser. No. 61/887,916, filed 7 Oct. 2013. The foregoing are all incorporated fully by reference herein.

BACKGROUND OF THE DISCLOSURE

1. Field of the Disclosure

The present disclosure relates to improved adhesive compositions suitable for anchoring or fixing elements in a base or structural body, and to methods of anchoring. More specifically, the present disclosure is directed towards improved adhesive compositions and methods that are especially well suited for curing such compositions at lower temperatures, without compromising desirable characteristics such as strength and durability. Improvements in the adhesive compositions and anchoring methods that pertain to stability and enhanced shelf life are also presented.

2. Discussion of Related Art

It is well known that adhesive systems are useful for fixing or anchoring materials in or to rock, masonry, and concrete. Such systems typically involve the use of synthetic resins and monomers that are maintained separately from a hardening or curing agent until they are combined at or near the point of fastening. A variety of additional and often optional adjuvants may also be used with adhesive systems.

By way of example, U.S. Pat. No. 5,157,072 to Hense, et al., teaches ethylenically unsaturated, substituted cycloaliphatic compounds as monomers and resins for minimizing shrinkage of the adhesive when used for anchoring bolts in bore holes. However, Hense, et al., is silent on low shrinkage stress. U.S. Pat. No. 5,288,767 to Cramer, et al., teaches a methacrylate monomer in the first component together with diluent monomers. One of the stated goals of this patent is to eliminate styrene as a co-monomer, but Cramer, et al., is silent on the subject of low-temperature curing. U.S. Pat. No. 6,037,408 to Weber, et al., is similar to the Cramer '767 patent, but it requires the use of very high levels of monomer and is silent on the affects of low temperature cure. Variously, U.S. Pat. No. 6,583,259, Weber, et al., is concerned with adhesives to bond to wet boreholes; U.S. Pat. No. 7,544,739, to Liu, et al. teaches a composition for use under conditions of elevated temperatures; and U.S. Pat. No. 5,077,324 to Kistner, et al., is concerned with extending the shelf life the formulation prior to use. Neither any of the foregoing, nor a great many other references are directed towards adhesive compositions that are suitable for curing at low temperatures.

It is often the case that adhesives must be applied to concrete and masonry under adverse weather conditions involving low temperatures and/or excess moisture. Unfortunately, it is not until the arrival of warmer weather at some later point in time that weakness or failure of the adhesives are observed. The effects of warming the substrate have been largely ignored in the past. Often, products that are developed for cold environments make the assumption that the substrate will not warm appreciably. Another tactic that has often been employed is to produce multiple variations of a product where several closely related compositions are developed, each associated with a specific temperature range. Under new protocols, however, the costs for testing can be prohibitive for a product line with multiple adhesives.

SUMMARY OF THE DISCLOSED EMBODIMENTS

In light of the foregoing, it is desirable to provide an adhesive composition that not only can be cured at low temperatures, but that also exhibits good strength and structural integrity over a wide range of temperature conditions. Moreover, another disadvantage of many adhesive compositions that are currently commercially available is that they contain or include phthalates. Phthalates, or phthalate esters, are often used in adhesive formulations as phlegmatizing agents to prevent the rapid and explosive reaction of certain curing agents when they are physically disturbed. Over concerns related to health reasons, however, phthalates are being phased out of many products in the United States, Canada, Europe and elsewhere in the world. Accordingly, it is desirable to provide an adhesive composition that does not include phthalates yet does not compromise safety.

The present disclosure provides an adhesive composition for anchoring materials in or to concrete or masonry that comprises from about 20% to 80% by weight of the entire composition of a reactive resin monomer/acetoacetoxy monomer/silane monomer solution; and a curing agent. In one aspect, the present disclosure provides a composition for anchoring materials in or to concrete or masonry that is made by mixing a first composition and a second composition. The first composition comprises from about 20% to 80% by weight of the entire composition of a reactive resin/acetoacetoxy monomer/silane monomer solution; in addition to an accelerant; inhibitor; and filler. The second composition comprises a curing agent; diluents as required to provide a phlegmatizing agent or flow; and filler.

According to another non-limiting embodiment, the present disclosure provides a phthalate-free composition for anchoring materials in or to concrete or masonry that is made by mixing a first composition and a second composition. The first composition comprises from about 20% to 80% by weight of the entire composition of a phthalate-free methacrylate monomer/acetoacetoxy monomer/silane monomer solution; in addition to an accelerant; an inhibitor; a filler and optional adjuncts. The second composition comprises a free radical initiator; phthalate-free diluents as required to provide a phlegmatizing agent or flow; and optional adjuncts.

DETAILED DESCRIPTION OF THE DISCLOSED EMBODIMENTS

The present disclosure provides non-limiting examples of adhesive compositions for anchoring materials in or to concrete or masonry. Examples of techniques in which adhesives are used to fix or anchor materials in or to rock, masonry, and concrete substrates include, but are not limited to; application directly to the surface of a substrate, application to the substrate after it has been modified to expose underlying aggregate or fresh substrate, application into grooves which have been cut into the substrate or one or more fissures which formed in the substrate, and application into holds drilled into the substrate. Common materials fixed to or anchored in the substrate include, but are not limited to; rock, masonry, concrete, ceramics, glass, metal, wood, plastic, fiber reinforcement, composites of fiber reinforcement, and the like.

The materials to be anchored in or to concrete or masonry include, but are not limited to: metallic objects such as steel rods and steel bolts; ceramics; other concrete or masonry members; plastics; glasses; woods; so-called "high performance" or reinforcement fibers such as carbon, glass, and aramid; and composites of so-called "high performance" or reinforcement fibers in combination with a polymeric binder; as well as combinations of any of the foregoing As indicated above, one of the motivating factors for the present disclosure was to develop an adhesive composition that cured at low temperatures without compromising strength of the adhesive. In the course of developing such a composition, it was also recognized that it might also be possible to impart other desirable features to the adhesive composition. Thus, it was postulated that the inclusion of a silane group, for example, might help promote adhesion of the composition to a cementitious substrate in wet or humid conditions. In addition, it was felt that an acetoacetoxy functional group might help promote adhesion of the composition to the insert, the substrate, or both. Under most conditions, these two monomers do not appear to significantly improve performance of an anchoring adhesive. Surprisingly, however, it was found that the presence of both an acetoacetoxy moiety and a silane moiety can provide a synergistic effect when curing takes place at low temperatures. Use of these monomers has unexpectedly resulted in demonstrably better curing at low temperatures. For instance, when acetoacetoxyethyl methacrylate and methacryloxypropyl trimethoxysilane (MPTMS) are used together in a first adhesive composition, a 20% improvement in mechanical strength has been observed when the adhesive was cured at low temperatures and then warmed to standard temperature.

Quite surprisingly, during the development of the adhesive compositions presented and described herein, it has also been discovered that the synergistic effect obtained upon the combination of silane and acetoacetoxy moieties is unexpectedly enhanced by the presence of a phthalate-free free radical initiator. Remarkably, the adhesive compositions presented and described herein have been shown to be curable at low temperatures, without any compromise as to strength, durability or structural integrity whether at low, moderate or elevated temperatures. In other words, the silane-containing, and acetoacetoxy-containing compositions disclosed and described herein, which can additionally be prepared phthalate-free, may be cured at low temperatures and yet retain the ability to perform at least as well as—if not better than—commercially available adhesive compositions, whether at low, moderate or elevated temperatures. The use of phthalate-free components in the formulations presented herein can result in an approximately 10% increase in strength and durability characteristics following cure at low temperatures.

Reactive Resin

In discussing resins and monomers herein, it is to be understood that these terms may be used interchangeably. The molecules, which are often referred to as resins, are in reality high molecular weight monomers from a chemistry standpoint. However, the terms resin and monomer are often used interchangeably in the adhesives trade and thus the terms are used without chemical distinction herein. No limitation(s) are intended or implied in the adhesive compositions disclosed and described herein based on such terminology.

The adhesive compositions discussed and describe herein comprise, in a first component, first portion or first composition, at least one synthetic resin or polymerizable monomer selected from among: acrylate monomers; allylic resins; bis-maleimide resins; epoxy acrylate resins; epoxy methacrylate resins; methacrylate monomers; phenolic-based acrylates; phenolic-based methacrylates; unsaturated polyester resins; urethane acrylate resins; urethane methacrylate resins; and vinyl ester resins. In one non-limiting embodiment, one of the synthetic resins is preferably an alkoxylated bisphenol or a novolac compound having one or more functional acrylate or methacrylate groups. A novolac—also spelled novolak—is a phenol-aldehyde condensation prepolymer obtained by condensing phenolic monomers with a stoichiometric deficiency of aldehydes. Without being bound by theory, it is believed that alkoxy groups, of which ethoxy and propoxy groups are the most common, can improve adhesion to concrete, provide stress relief within the polymer network, and lower viscosity as compared to a "base" resin, that is, a resin that does not include an alkoxy group or groups. A low degree of condensation with the alkoxy group will often add the aforementioned benefits without affecting the glass transition temperature, Tg, of the cured polymer. Resins with higher degrees of alkoxylation are often useful where toughening and flexibility in the cured polymer are advantageous.

In one aspect, an adhesive composition of the present disclosure includes at least one polymerizable monomer that contains or includes at least one functional group selected from among: acrylates; methacrylates; as well as combinations thereof; in combination with a phenolic selected from among; bisphenol A; bisphenol F; bisphenol S; novolac monomers; and combinations thereof. According to a preferred non-limiting embodiment, the reactive resin includes an alkoxy group. In a more preferred non-limiting embodiment, the alkoxy group(s) is positioned in the reactive resin between the phenolic and the acrylate or methacrylate group(s). Especially preferred for use with the present non-limiting embodiments are alkoxylated methacrylates and alkoxylated dimethacrylates, with ethoxylated bisphenol A dimethacrylate being particularly preferred.

Ethoxylated bisphenol A dimethacrylate resins with no more than 4 mole ethoxylation are particularly suitable for use in the first composition of the non-limiting adhesive formulations of the present disclosure. Degrees of condensation of ethylene oxide groups from about 1.0 mole to about 4.0 moles are preferred, with an average degree of condensation of about 2.0 moles to above 4.0 moles being more preferred. This resin is dysfunctional and has relatively few ethoxylate groups, thus it has good crosslink density, which results in high mechanical strength. This monomer also has a high glass transition temperature, $T_g$, which allows for higher end use temperatures of the adhesive. It also has a very high molecular weight and subsequently exhibits very low shrinkage stress.

Diluent Monomer

Diluent monomers, also called reactive diluents, are often used in adhesive compositions to bring the viscosity of a reaction mixture into a desirable range. Such diluents are also used to incorporate functionality to improve the adhesion of these compositions to the insert, the substrate, or both. Both multifunctional and monofunctional diluents may be used with the low temperature curable compositions of the present disclosure. For the purposes of this work, the terms "multifunctional diluent" and "monofunctional diluent" are assumed to be descriptive of the ethylenic unsaturation of the diluent monomer. Note, however, that neither the term "multifunctional" nor "monofunctional" should be interpreted to preclude the possibility that the diluent monomer may have other functionality useful to the non-limiting embodiments discussed herein, aside from ethylenic unsaturation. Multifunctional diluents can be used to impart greater crosslink density, which can improve chemical resistance, moisture tolerance and performance at higher use temperatures. Accordingly, either liquid or solid reactive organic diluents may be used with the reactive resins described herein to provide viscosity control, impart functionality, and/or increase the cross-linking density of the reaction mixture; as such, use of diluent monomers is only required for reaction mixtures in which the afore mentioned properties must be altered. If a diluent monomer is used it is therefore desirable that the diluent monomer contain at least one functional group that is reactive with the polymerizable monomer described above. High molecular weight is also desirable in a diluent monomer; high molecular weight minimizes shrinkage stress and imparts low volatility. Reactive diluents are optional for the non-limiting embodiments discussed herein; however, those reactive diluents suitable for use with the adhesive compositions of the present disclosure include ethylenically unsaturated monomers. Among ethylenically unsaturated monomer diluents that can be used with the non-limiting embodiments discussed herein, it is preferred that the reactive organic diluent include at least one monofunctional monomer to lower viscosity and at least one multi-functional monomer to increase crosslink density. As with the reactive resin, polar groups such as alkoxylates; carbonyls; ether linkages; ester linkages; hydroxyls; amines; and amides are believed to improve adhesion to the substrate.

As indicated above, monofunctional monomers may also be used with the adhesive formulations disclosed and described herein. Suitable monofunctional monomers for use with the non-limiting embodiments discussed herein include, but are not limited to: methacrylic acid, methyl methacrylate, isopropyl methacrylate, isobutyl methacrylate, tert-butyl methacrylate, n-butyl methacrylate, 2-ethylhexyl methacrylate, caprolactone methacrylate, steryl methacrylate, 2-phenoxyethyl methacrylate, tetrahydrofurfuryl methacrylate, glycidyl methacrylate, isobornyl methacrylate, hydroxyethyl methacrylate, phosphate esters of hydroxyethyl methacrylate, hydroxypropyl methacrylate, hydroxybutyl methacrylate, benzyl methacrylate, dicyclopentyl methacrylate, dicyclopentadienyl methacrylate, phthalyl methacrylate, diethylaminoethyl methacrylate, tert-butylaminoethyl methacrylate, acrylic acid, beta-carboxyethyl acrylate, tert-butyl acrylate, n-butyl acrylate, 2-ethylhexyl acrylate, caprolactone acrylate, steryl acrylate, 2-phenoxyethyl acrylate, tetrahydrofurfuryl acrylate, isobornyl acrylate, hydroxybutyl acrylate, benzyl acrylate, dicyclopentyl acrylate, dicyclopentadienyl acrylate, cyclic trimethanolpropane formal acrylate, trimethylcyclohexane acrylate, and the like, as well as combinations thereof.

Multifunctional monomers that are suitable for use with the non-limiting embodiments discussed herein include, but are not limited to: ethylene glycol dimethacrylate, diethlyene glycol dimethacrylate, triethylene glycol dimethacrylate, dipropylene glycol dimethacrylate, 1,3-butylene glycol dimethacrylate, 1,4-butanediol dimethacrylate, 1,6-hexanediol dimethacrylate, neopentyl glycol dimethacrylate, cyclohexane dimethanol dimethacrylate, dicyclopentyl dimethacrylate, dicyclopentadienyl dimethacrylate, glyceryl trimethacrylate, trimethylolpropane trimethacrylate, pentaerythritol trimethacrylate, pentaerythritol tetramethacrylate, dipentaerythritol pentamethacrylate, ethylene glycol diacrylate, diethlyene glycol diacrylate, triethylene glycol diacrylate, dipropylene glycol diacrylate, 1,3-butylene glycol diacrylate, 1,4-butanediol diacrylate, 1,6-hexanediol diacrylate, neopentyl glycol diacrylate, cyclohexane dimethanol diacrylate, dicyclopentyl diacrylate, dicyclopentadienyl acrylate, glyceryl triacrylate, trimethylolpropane triacrylate, pentaerythritol triacrylate, pentaerythritol tetraacrylate, dipentaerythritol pentaacrylate, tris(2-hydroxy ethyl)isocyanurate triacrylate, alkoxylated variations of the foregoing monomers, and the like, as well as any combinations thereof. Additionally metallic acrylates and methacrylates can be use to increase crosslink density these include, but are not limited to acrylates and methacrylates of zinc, magnesium and calcium.

Other monomers, such as vinyl, allylic, maleate, mercaptan, and acrylamide monomers may also be used. Examples of these monomers which can be used with the non-limiting embodiments presented herein include, but are not limited to: styrene; vinyl toluene; methyl styrene; t-butyl styrene; divinyl benzene; hydroxyl butyl vinyl ether; butanediol divinyl ether; triethylene glycol divinyl ether; N-vinyl pyrolidinone; allyl methacrylate; diallyl phthalate; allyloxypropanediol; hydroxypolyethoxymonoallylic ether; allyl cinnimate; allyl glycidyl ether; maleic acid; maleic anyhydride; dimethyl maleate; dibutyl maleate; dioctyl maleate; dodecyl mercaptan; mercaptoethanol; mercaptopropionic acid; acrylamide; methacrylamide; N-methylol acrylamide; N-methylol methacrylamide; as well as combinations thereof.

Preferred diluent monomers for the non-limiting embodiments presented herein include: hydroxypropyl methacrylate, isobornyl methacrylate, tert-butyl methacrylate, methyl methacrylate, tetrahydrofurfuryl methacrylate, benzyl methacrylate, ethylene glycol dimethacrylate, trimethylolpropane trimethacrylate, tris(2-hydroxyethyl)isocyanurate triacrylate, and trimethylolpropane triacrylate. Tetrahydrofurfuryl methacrylate and trimethylolpropane trimethacrylate are particularly preferred.

Acetoacetoxy Functional Monomer

As indicated above, the use of an acetoacetoxy functional monomer has surprisingly been found to provide an unexpected, beneficial synergistic effect with respect to curing at low temperature when used in the presence of a monomer that contains a cross-linkable silane group. In addition to the main monomer described above, the adhesive compositions of the non-limiting embodiments presented herein therefore also comprise an ethylenically unsaturated monomer that contains at least one cross-linkable acetoacetoxy functional group. Acetoacetoxy functionality can be incorporated into the polymer matrix in the adhesives disclosed herein using acetoacetoxy alkyl acrylates such as, but not limited to: acetoacetoxyethyl acrylate; acetoacetoxyethyl methacrylate; diacetone acrylamide; acetoacetoxy vinyl ether; as well as combinations of any of the foregoing. A preferred reactive monomer diluent is acetoacetoxyethyl methacrylate, often abbreviated AAEM.

Silane Monomer

As indicated above, the adhesive compositions of the non-limiting embodiments discussed herein also comprise an ethylenically unsaturated monomer that contains at least one cross-linkable silane group. Cross-linkable silane groups that are preferred for use with the compositions disclosed herein comprise hydrolizable alkoxy groups. Examples of hydrolizable alkoxy groups that are suitable for use with the non-limiting embodiments presented herein may be selected from among: hydroxy group; halogen atom; alkoxy group; and acyloxy group; as well as combinations of any of the foregoing. Silane monomers having alkoxy groups are preferred.

Examples of monomers having both a point of polymerizable unsaturation and a cross-linkable silicon group include: methacryloxypropyl polyalkoxy silanes such as methacryloxypropyl trimethoxysilane, methacryloxypropylmethyl dimethoxy silane and methacryloxypropyl triethoxy silane; acryloxypropyl polyalkyloxy silanes such as acryloxypropyl trimethoxy silane, acryloxypropylmethyl dimethoxy silane, and acryloxypropyl triethoxy silane; vinylalkyl polyalkyloxy silanes such as vinyl trimethoxysilane, vinylmethyl dimethoxy silane and vinyl triethoxy silane; as well as combinations of any of the foregoing.

Curing Agent

Curing agents in the non-limiting embodiments presented herein are free-radical initiators used with adhesive compositions in order to initiate polymerization and provide cross-linking of the adhesive. Free radical initiators that are suitable for use with the non-limiting embodiments presented herein may be selected from among: peroxides; peracids; peresters; and peroxymaleates; as well as combinations of any of the foregoing. In addition, the adhesive compositions may also be cured by using physical curing techniques such as, but not limited to: radiant energy; thermal energy; as well as combinations thereof. Combinations of free radical initiators with physical techniques may also be appropriate for use with the low temperature adhesive compositions provided herein. Examples of peroxides that are suitable for use with the non-limiting embodiments presented herein include, but are not limited to: cumene hydroperoxide; cyclohexanone peroxide; diacyl peroxide; benzoyl peroxide; dibenzoyl peroxide; diisopropylbenzene dihydroperoxide; hydroperoxide; t-butyl monoperoxymaleate; lauryl peroxide; methyl ethyl ketone peroxide; t-butyl hydroperoxide; and mixtures thereof. Dibenzoyl peroxides are preferred peroxides.

Additional non-reactive components may also be added to the curing agent or free radical portion of the adhesive compositions disclosed and described herein. These additional components have been found to promote stability of the curing agent, retard degradation of the curing agent, and enhance certain characteristics of the curing agent. Examples of additional non-reactive components that maybe included with the curing agent in the adhesive compositions described herein include, but are not limited to, anti-oxidants, stabilizers, non-reactive diluents and plasticizers, as well as combinations of any of the foregoing. The foregoing additional components have been found to be useful in combination with certain peroxide free-radical initiators in general, and when used with dibenzoyl peroxide, in particular. Without being bound by theory, it is suspected that small quantities of certain solvents may be entrained with some of the components of the adhesive compositions presented herein, because of the nature of the as-received component from the respective manufacturer. The solvent may contribute to the solubility of the peroxide moiety within the curing agent portion of the adhesive compositions presented and described herein, thus contributing to the degradation of the peroxide, which in turn decreases the efficacy of the curing agent over time.

Somewhat surprisingly therefore, through use of a non-reactive diluent, a plasticizer or both a non-reactive diluent and a plasticizer, it was found that the solubility and therefore the degradation of the peroxide curing agent could be retarded. Interestingly, by selecting and using non-reactive diluents and/or plasticizers that are mutually insoluble and including these with the free-radical initiator, it was found that the solubility of the initiator could be minimized. By minimizing the solubility of the curing agent, in turn, it was found that the shelf life of the adhesive compositions prior to curing was enhanced over similar adhesive compositions that lacked a non-reactive diluent, plasticizer or both. In fact, in certain instances, improvements of up to three times the stability and shelf life have been observed to date for compositions that included a non-reactive diluent as opposed to analogous compositions that did not. Thus, extensions in shelf life from six months to over eighteen months were observed before cure for several of the non-limiting formulations described herein, upon the inclusion of small amounts of mineral oil with the curing agent portion of the adhesive composition. Examples of non-reactive diluents and plasticizers that may be used to stabilize peroxide curing agents such as dibenzoyl peroxide include, but are not limited to: di-n-butyl phthalate; diisobutyl phthalate; dicyclohexyl phthalate; butylbenzylphthalate; trialkylphosphates; triarylphosphates; alkylarylphosphates; alkyl ethers of mono and diethylene glycols, alkyl ethers of mono and dipropylene glycols; alkyl benzoates; benzoates of mono and diethylene glycols; benzoates of mono and dipropylene glycols; alkyl mono and di-isobutyrates; high molecular weight alkanes such as mineral oil and petrolatum; esters of naturally occurring fatty acids; naturally occurring oils; maleates and vinyl esters such as those described above in the section entitled Diluent Monomers; polyethylene glycol; polypropylene glycol; water; and the like. Additionally, non-reactive diluents such as ethylene glycol, propylene glycol, glycerol, urea and the like are often used to lower the freezing point of benzoyl peroxide mixtures. In one aspect of the non-limiting embodiments discussed herein, phthalate-free dibenzoyl peroxide mixtures are preferred.

Accelerants

Accelerants may be used with the adhesive compositions of the non-limiting embodiments presented herein. As will be understood by those skilled in the relevant art, the accelerant(s) that is appropriate for use with the low temperature adhesive compositions of the non-limiting embodiments presented herein will vary, depending upon selection of a free radical initiator. Accelerants that are suitable for curing via free radical mechanism include, but are not limited to organic compounds selected from among: thioamides such as thiourea, acyl thiourea, tetramethyl thiourea, diethylthiourea, dibutyl thiourea, ethylene thiourea, trimethyl thiourea, triphenyl thiourea and trioyl thiourea; mercaptobenzimidazol; mercapto acids; tertiary amines such as N,N-dialkyl toluidines, where the alkyl group is selected from among methyl, ethyl, hydroxyethyl, hydroxylpropyl, isopropyl and mixtures thereof; trialkyl amines, where alkyl is selected from among ethyl, propyl, and ethyl diethanol; N,N-dialkylanilines such as N,N-dimethylaniline and N,N-diethylaniline; 4,4-bis(dimethylamino) diphenylmethane; and mixtures thereof.

Inorganic materials as well as organic salts may also be used as accelerants with the non-limiting embodiments presented herein. Examples of inorganics and organic salts that are suitable for use with the adhesives presented and described herein include, but are not limited to: magnesium; tin; and certain salts such as cobalt naphthenate. It is also possible to use more than one accelerant with the adhesives presented herein. Accordingly, in one non-limiting embodiment, the adhesive compositions presented herein may include an organic compound, an inorganic, an organic salt as well as combinations of any of the foregoing.

In the course of the work described herein, it has also been found that formulations including dibenzoyl peroxide also preferably contain an accelerating agent in the first component or first portion, along with the resin and monomers. Accelerators suitable for use herein may be selected from among: N,N-diisopropanol-p-toluidine, N,N-dihydroxyethyl-p-toluidine; N,N-methylhydroxyethyl-p-toluidine; and mixtures of the foregoing.

Fillers

Adhesive compositions that are used for anchoring members often contain fillers to both impart strength and reduce cost. As will be appreciated by those knowledgeable in the relevant art, fillers can also be used to control viscosity. Fillers that are appropriate for use with the non-limiting embodiments presented herein include, but are not limited to: silica fume; quartz sand; finely ground quartz; a metal oxide such as magnesium oxide, aluminum oxide, and calcium oxide; clinker; calcium carbonate; metal shavings or particles; barium sulfate; aluminum trihydrate; wollastonite; kaolin clay; mica; feldspar; nepheline syenite; glass beads; corundum; talc; chalk; ceramic microspheres; and cement; in addition to combinations of any of the foregoing. In one aspect, either the first portion or the second portion comprising non-limiting embodiments of the adhesives presented and described herein contains at least one filler, which may comprise the same or different fillers. In another aspect, both the first composition and the second composition contain fillers. In yet another aspect of the non-limiting embodiments presented herein, the first component or first portion preferably contains at least one filler that is reactive with water, examples of which include cement and metal oxides. Cement is often a preferred filler, as it ties up water in the adhesive system and allows for better performance when an anchor is exposed to elevated temperatures after cure. As will be understood by those skilled in the relevant art, fillers may be mixed into the first, monomer portion and/or the second, curing agent portion of the adhesives presented and discussed herein.

Inhibitors

Inhibitors are required to prevent polymerization of the monomers and resins of the first component or first portion during storage. Although inhibitors are present in reactive resins and monomers as they are received from manufacturers, additional inhibitors are often required to improve shelf life of the final product or to counteract the presence of the accelerator. Polymerization inhibitors appropriate for non-limiting embodiments presented include, but are not limited to: methyl hydroquinone, hydroquinone, catechol, oxypiperidol, hydroqui-none monomethyl ether, mono-tert-butyl hydroquinone, di-tert-butyl hydroquinone, p-benzo-quinone, 2,5-diphenyl-p-benzoquinone, p-benzoquinone, trimethyl hydroquinone, naptha-quinone, di-tert-butyl methyl phenol, dimethyl-t-butyl phenol, and combinations of any of the foregoing.

Thickeners

Thickeners or are often used in adhesive compositions to reduce the tendency of the liquid resin to flow or drain from vertical surfaces. As will be understood by those skilled in the relevant art, thickeners can be chosen to impart thixotropic, dilantant, pseudoplastic, or rheopectic properties or increase Newtonian viscosity. Thickeners that are suitable for use with adhesive compositions of the present disclosure include, but are not limited to: polymerics, fumed silica, organosilicas, clays and silicic acid. Commercially available fumed silicas that are particularly suitable for use with the non-limiting embodiments presented herein are sold under such trademarks as Aerosil® available from Evonik Industries, and Cab-o-Sil® available from Cabot Corp

Colorants

Occasionally, it has been found advantageous to include pigments, dyes or colorants as part of either the first portion, the second, or both the first and second portions of the novel adhesive compositions described herein. Colorants are typically a blend of one or more pigments, which are dispersed in a liquid vehicle, or dyes, which are dissolved into the liquid vehicle, and are used for aesthetic purposes or to provide a visual indication of proper mixing of the two parts of the composition. Color can also be indicative of a specific product for ease of identification in the field. As will be understood by those skilled in the relevant art, dyes can also be chosen to provide a visual cue in response to changes that occur during the curing process of the non-limiting adhesive compositions described herein. Examples of color changing dyes include, but are not limited, to: crystal violet and phenolphthalein, used when a pH change is anticipated in the curing process; and methylene blue and bipyridine, which may be used to indicate the presence of a free radical reaction. A combination of pigments and dyes, including color changing dyes, may be used to achieve a desired effect.

Both organic and inorganic pigments may be used with the non-limiting adhesive composition embodiments presented and discussed herein. Examples of such pigments include, but are not limited to: titanium dioxide, iron oxides of various colors, raw umber, carbon black, lamp black, phthalocyanine blue, phthalocyanine green, naphthol red, toluene red, carbazole violet, quinacridones of various colors, hansa yellow, diarylide yellow, as well as combinations of any of the foregoing. Additionally, some commonly used fillers that are also classified as pigments may be used with the adhesive compositions presented herein. Examples pigment-fillers include zinc oxide, barium sulfate, as well as mixtures of the foregoing.

Adjuncts

It is recognized that other components or adjuvants known to those skilled in the art may also optionally be included in the non-limiting adhesive compositions embodiments presented herein. Such components may include, but are not limited to: antifoaming agents; catalysts; coupling agents; non-reactive diluents; dyes; fillers; fungicides; impact modifiers; odor maskants; pigments; solvents; stabilizers; surfactants; wetting agents; as well as combinations of any of the foregoing.

Formulations

A number of different formulations that included varying amounts of the above active and optional ingredients were prepared and evaluated for curing at low and medium temperatures, and testing at low, medium and high temperatures. The term "low temperature" as used herein is understood to indicate temperatures on the order of approximately $-10°$ C.$\pm 3°$ C. ($14°$ F.$\pm 4°$ F.). The term "medium temperature," "ambient temperature". "standard temperature" or "average temperature" as used herein is understood to refer to room temperature or temperatures of approximately $23°$ C.$\pm 3°$ C. ($72°$ F.$\pm 4°$ F.). The term "high" or "elevated temperatures" as used herein is understood to indicate temperatures on the order of approximately $82°$ C.$\pm 3°$ C. ($180°$ F.$\pm 4°$ F.). Thus, a variety of different reactive main monomers were used in combinations with acetoacetoxy-containing monomers, both with and without monomers that contained silane groups.

Phthalate-Free Compositions

As indicated above, formulations that comprised a reactive resin to which an acetoacetoxy-silane monomer combination was added were found to exhibit remarkably good strength and durability characteristics at room medium temperatures following curing at low temperatures. In many instances, the performance of these non-limiting adhesive composition embodiments showed nearly a two-fold improvement over other formulations that did not include the acetoacetoxy-silane monomer combination. Even more unexpectedly, however, a further improvement in performance characteristics was observed when adhesive compositions were formulated without the presence of any phthalate moieties. Phthalate-free adhesive compositions of the present disclosure have surprisingly been found to be especially well suited for curing at low temperatures. On average, the removal of phthalates from the reactive resin/acetoacetoxy/silane monomer combinations presented herein resulted in a 10% improvement in performance over adhesive compositions in which phthalates were included.

Phthalates are typically introduced into adhesive compositions with the free radical initiators that are used. According to one aspect of the non-limiting embodiments of the instant disclosure, therefore, noticeable improvements in adhesive performance can be observed in formulations at standard temperatures following cure at low temperatures when free radical initiators are used in the non-limiting adhesive composition embodiments that are phthalate-free. Examples of phthalate-free free-radical initiators that are suitable for use herein are listed above under the "Curing Agent" heading. Phthalate-free dibenzoyl peroxides can be formulated from high solids dibenzoyl peroxide powder, by processing it with a phthalate-free diluent as described above under the "Curing Agent" heading. Alternately, commercially available phthalate-free dibenzoyl peroxide may be used in powder, paste or liquid form, which may then be diluted as desired with a phthalate-free diluent. Benzoyl peroxides are commercially available under a variety of brand names such as, but not limited to, the Perkadox® series of free radical initiators available from Akzo Nobel, Lucero® series of free radical initiators from Arkema and Benox® series from United Initiators.

EXAMPLES

A number of adhesive compositions were prepared in accordance with the teaching of the present disclosure for use in comparison to commercially available adhesive compositions. Performance characteristics were evaluated after cure at standard room temperature of 23±4° C. (73±8° F.) and at lower temperatures of −10° C. (14° F.) to mimic curing in cold conditions. Test members were prepared as follows. A channel or bore hole was created in a formed or smooth steel-troweled face of a Portland cement-based concrete test member of compressive strength in the range of 25.3 to 28.0 MPa (3,666 to 4,059 psi). The borehole was made using a rotary-hammer drill with a 17.5 mm (¹¹⁄₁₆ inch) diameter carbide bit meeting the requirements of American National Standards Institute Bulletin 212.15 (ANSI B212.15, available in the United States from the Cemented Carbide Producers' Association). The borehole was drilled to a depth of 79.4 mm (3.125 inch) embedment perpendicular to the test surface.

The channel chamber was then cleaned by blowing compressed air at 0.59 MPa (85 psi) into the hole for four seconds, followed by brushing the bore hole for four complete strokes using a nylon brush of greater diameter than the bore hole, followed by blowing compressed air at 0.59 MPa (85 psi) into the hole a second time, also for four seconds. The anchoring adhesive to be tested was then injected into the borehole in such a manner as to ensure that the borehole was evenly filled from the bottom of the chamber to a point approximately two-thirds full. A 15.9 mm (⅝ inch) diameter threaded metal rod was then inserted into the adhesive with a slight twisting motion and the adhesive and insert were allowed to cure undisturbed for one hour. After one hour, a load was placed on the metal rod anchors in tension until the point of failure in accordance with test methods in ASTM E488 as modified by ICC-ES Acceptance Criteria AC308. Tensile testing was performed using an in-house confined or restrained tension testing rig using a 13.6 kg (30 ton) hydraulic ram and a 22.7 kg (50 ton) load cell, in compliance with ASTM E488 as modified by ICC-ES Acceptance Criteria AC308. The confined test setup was used to maximize strain on the adhesive while minimizing the risk of concrete failure.

For the evaluation of the formulations disclosed herein after cure at lower temperature, another series of smooth-faced, steel-troweled Portland cement-based concrete test members were prepared in a manner identical to the procedure outlined immediately above. The prepared test members were then placed into a controlled temperature chamber maintained at −10° C. (14° F.) and allowed to come to temperature equilibrium over the course of several days. The anchoring adhesive was then injected into the borehole in the temperature-controlled chamber, tilling the drilled cavity from the bottom of the borehole to a point approximately two-thirds full. A 15.9 mm (0.625 inch) diameter threaded metal rod was then inserted into the adhesive with a slight twisting motion and the adhesive and insert were left undisturbed and permitted to cure at −10° C. (14° F.) for twenty-four hours. At the end of that period, the test member was removed from the controlled temperature chamber and allowed to come to room temperature of approximately 23±4° C. (73±8° F.). The anchors were again loaded in tension until the point of failure in accordance with test methods in ASTM E488 as modified by ICC-ES Acceptance Criteria AC308, as indicated above. Tensile testing was performed using a confined or restrained tension test. The confined test setup was used to maximize strain on the adhesive while minimizing the risk of concrete failure.

Tables 1, 2 and 3 below contain the results of tensile tests performed on a variety of adhesive compositions that were cured at different temperatures in the manner described above. The compositions that were evaluated include commercially available adhesive products as indicated in Table 1. Tables 2 and 3 contain a summary of a number of different formulations that were evaluated during the development of the low-temperature cure compositions presented and described herein.

Specifically and with reference to Table 1, the commercially available adhesives that were evaluated include: 1) HY 150 Max, manufactured by Hilti Aktiengesellschaft of Schaan, Liechtenstein, available in the United States online and through various distributors; 2) AC 100+ Gold™, available from Powers Fasteners, Inc., of Brewster, N.Y.; 3) FIS VW from Fischerwerke GmbH and Co. KG of Waldachtal, Deutschland, not available in the United States; and 4) Sikadur® AnchorFix-1, from Sika AG of Baar, Switzerland, and available through various distributors in the United States. Both HY 150 Max and AC100+ Gold™ have approvals in the United States for installations under low temperature cure conditions. HY 150 Max, FIS VW and AnchorFix-1 have approvals in Europe for installations under low temperature cure conditions.

TABLE 1

Test Results for Competitive Products

Bond Strength After Cure (MPa)

| | Company | | | |
|---|---|---|---|---|
| | Hilti | Powers | Fischer | Sika |
| Product | HY150 Max | AC100+ Gold | FIS VW | Anchorfix-1 |
| Cure at 23° C., Test at 82° C. | 16.69 | 9.09 | 14.77 | 12.12 |
| Cure at 23° C., Test at 23° C. | 21.95 | 16.32 | 18.62 | 15.44 |
| Cure at −10° C., Test at 23° C. | 14.52 | 9.40 | 10.69 | 9.58 |
| Care at −10° C., Test at −10° C. | 19.71 | NE[a] | NE[a] | 12.17 |

Low Temperature vs. Standard Temperature Degree of Cure[b] (%)

| | | | |
|---|---|---|---|
| 66.2 | 57.6 | 57.4 | 60.3 |
| Phthalates present? Yes | Yes | Yes | Yes |

Notes to Table 1
[a]NE—Not Evaluated
[b]This calculated value is the ratio of the strength at 23° C. after cure at −10° C. compared to the strength at 23° C. after cure at 23° C., expressed as a percent.

Table 2 contains a summary of representative formulations that were tested over a range of different concentrations combinations. The Examples in Table 2 are comparable in strength to the competitive products shown in Table 1.

TABLE 2

Formulations and Test Results of Example Compositions

| Example | 1 | 2 | 3 | 4 | 5 | 6 |
|---|---|---|---|---|---|---|
| First Portion (%) | | | | | | |
| Reactive Resin | 22.4 | 17.5 | 22.3 | 17.1 | 17.1 | 17.0 |
| Diluent monomer | 15.2 | 25.0 | 15.1 | 20.8 | 20.8 | 20.2 |
| Filler | 60.2 | 54.3 | 59.8 | 59.3 | 59.2 | 59.7 |
| Inhibitor | <0.1 | <0.1 | <0.1 | <0.1 | <0.1 | <0.1 |
| Accelerator | 0.2 | 0.3 | 0.8 | 0.3 | 0.4 | 0.6 |
| Colorant | 0.4 | 0.4 | 0.6 | 0.5 | 0.5 | 0.5 |
| Thickener | 1.6 | 2.5 | 1.4 | 2.0 | 2.0 | 2.0 |
| Second Portion (%) | | | | | | |
| Free radical initiator | 11.9 | 13.0 | 14.8 | 14.6 | 21.3 | 14.5 |
| Nonreactive diluent | 36.9 | 40.2 | 33.0 | 35.6 | 28.9 | 35.6 |
| Filler | 48.0 | 43.5 | 48.9 | 45.6 | 45.6 | 45.3 |
| Colorant | 3.2 | 3.3 | 3.3 | 2.7 | 2.7 | 2.9 |
| Thickener | 0.0 | 0.0 | 0.0 | 1.5 | 1.5 | 1.7 |
| Bond Strength After Cure (MPa) | | | | | | |
| Cure at 23° C., Test at 82° C. | 13.04 | 10.31 | 10.99 | 11.05 | 9.60 | 12.88 |
| Cure at 23° C., Test at 23° C. | 15.78 | 10.46 | 16.31 | 15.03 | 15.32 | 21.83 |
| Cure at −10° C., Test at 23° C. | 7.99 | 4.96 | 11.52 | 10.26 | 9.21 | 13.50 |
| Low Temperature vs. Standard Temperature Degree of Cure[b] (%) | | | | | | |
| | 50.6 | 47.4 | 70.7 | 68.3 | 60.1 | 61.9 |
| Phthalates present? | Yes | Yes | Yes | Yes | Yes | Yes |

Note to Table 2
[a]This value, calculated for the entries in the table from their bond strengths, is the ratio of the strength at 23° C. after cure at −10° C. compared to the strength at 23° C. after cure at 23° C., expressed in percent.

Following the initial discovery that acetoacetoxy-silane monomers imparted discernable low-temperature cure improvements to the main reactive resins, a series of experiments were conducted using phthalate-free initiators. As these latter adhesive formulations exhibited even more remarkable strength characteristics at medium temperatures following low temperature cure, a number of experiments were conducted in order to evaluate alternate adhesive compositions. The results of these studies are summarized in Table 3 below. Examples A through C of Table 3 represent a preferred aspect of the non-limiting embodiments presented herein, in that they provide phthalate-free compositions well suited for low temperature cure. In examples A and B the phthalate-free radical initiator used was Perkadox® L-40 RPS; and in examples C and D the free radical initiator used was Perkadox® BTW50. Examples E through H represent an alternate aspect of the non-limiting embodiments presented herein, in which the adhesive composition is not phthalate-free. Perkadox® 40e was used as the free radical initiator in examples E through H.

TABLE 3

Formulations and Test Results for Sample Compositions

| Example | A | B | C | D | E | F | G | H |
|---|---|---|---|---|---|---|---|---|
| First Portion (%) | | | | | | | | |
| Reactive Resin | 18.0 | 18.0 | 17.4 | 18.0 | 18.0 | 16.8 | 16.8 | 17.0 |
| Acetoacetoxy monomer | 1.7 | 1.7 | 1.7 | 1.7 | 1.7 | 3.2 | 0 | 0 |
| Silane monomer | 0.5 | 0.5 | 0.6 | 0.5 | 0.9 | 0.9 | 0.0 | 0.0 |
| Diluent monomer | 19.4 | 19.4 | 19.1 | 19.4 | 19.4 | 16.8 | 20.0 | 20.2 |
| Filler | 57.3 | 57.3 | 56.6 | 57.3 | 57.3 | 59.2 | 59.2 | 59.7 |
| Inhibitor | <0.1 | <0.1 | <0.1 | <0.1 | <0.1 | <0.1 | <0.1 | <0.1 |
| Accelerator | 0.9 | 0.9 | 0.8 | 0.9 | 0.9 | 0.6 | 0.6 | 0.5 |
| Colorant | 0.3 | 0.3 | 1.0 | 0.3 | 0.3 | 0.3 | 0.3 | 0.3 |
| Thickener | 2.1 | 2.1 | 2.8 | 2.1 | 2.1 | 2.2 | 2.2 | 2.2 |
| Second Portion (%) | | | | | | | | |
| Free radical initiator | 14.5 | 13.3 | 14.2 | 14.6 | 14.5 | 14.5 | 14.5 | 14.6 |
| Nonreactive diluent | 38.5 | 39.0 | 36.0 | 36.9 | 35.6 | 35.6 | 35.6 | 35.6 |
| Filter | 41.9 | 42.9 | 38.0 | 43.7 | 45.3 | 45.3 | 45.3 | 45.3 |

TABLE 3-continued

Formulations and Test Results for Sample Compositions

| Example | A | B | C | D | E | F | G | H |
|---|---|---|---|---|---|---|---|---|
| Colorant | 2.8 | 3.1 | 9.5 | 2.8 | 2.8 | 2.8 | 2.9 | 2.9 |
| Thickener | 2.3 | 1.7 | 2.3 | 2.0 | 1.8 | 1.8 | 1.7 | 1.7 |
| Bond Strength After Cure (MPa) | | | | | | | | |
| Cure at 23° C., Test at 82° C. | 15.36 | 15.14 | 18.01 | 13.45 | 14.56 | 12.84 | 12.38 | 10.65 |
| Cure at 23° C., Test at 23° C. | 22.28 | 20.77 | 23.56 | 18.98 | 21.49 | 21.55 | 21.07 | 20.35 |
| Cure at −10° C., Test at 23° C. | 21.28 | 20.42 | 24.14 | 18.97 | 19.80 | 19.49 | 18.30 | 16.32 |
| Cure at −10° C., Test at −10° C. | 22.10 | 21.73 | NE$^a$ | NE$^a$ | 21.65 | NE$^a$ | NE$^a$ | NE$^a$ |
| Low Temperature vs. Standard Temperature Degree of Cure$^b$ (%) | | | | | | | | |
|  | 95.5 | 98.3 | 102 | 99.9 | 92.1 | 90.5 | 86.9 | 80.2 |
| Phthalates present? | No | No | No | No | Yes | Yes | Yes | Yes |

Notes to Table 3
$^a$NE—Not Evaluated
$^b$This value, calculated for the entries in the table from their bond strengths, is the ratio of the strength at 23° C. after cure at −10° C. compared to the strength at 23° C. after cure at 23° C. expressed as a percent.

A number of different formulations were tried and evaluated for strength and performance characteristics after curing at different temperatures. In one series of experiments, adhesive formulations with different ratios/levels of AAEM and silane were prepared and evaluated. The different combinations that were tested include (expressed in terms of weight % composition): a) 1.67% AAEM with 0.5% silane; b) 1.67% AAEM with 1.5% silane; c) 5% AAEM with 1.67% silane and d) 5% AAEM with 1.5% silane). All of the foregoing formulations gave equivalent bond strengths when cured at −10° C. and tested at 23° C.

As a result of the foregoing work and in accordance with one aspect of the instant disclosure, a first portion of the low-temperature curable reaction mixtures comprises 30-70% of a mixture comprising at least one reactive resin, at least one acetoacetoxy monomer, and at least one silane monomer, with the balance selected from at least one of: accelerators, diluent monomers, inhibitors, dyes, fillers, pigments, and thickeners or thixotropic agents; as well as combinations of the foregoing. A second portion of the low-temperature curable reaction mixtures comprises 10-25% of a free radical initiator with the balance selected from at least one of: non-reactive diluents, dyes, fillers, pigments, and thixotropic agents, as well as combinations of the foregoing.

Additionally, according to another aspect of the non-limiting embodiments presented herein and as a result of the foregoing work, a first portion of the low-temperature curable reaction mixtures comprises 30-70% of a phthalate-free mixture comprising at least one reactive resin, at least one acetoacetoxy monomer, and at least one silane monomer, with the balance selected from at least one of: accelerators, diluent monomers, inhibitors, dyes, fillers, pigments, and thickeners or thixotropic agents; as well as combinations of the foregoing. A second portion of the low-temperature curable reaction mixtures comprises 10-25% of a phthalate-free mixture comprising of at least one free radical initiator with the balance selected from at least one of: non-reactive diluents, dyes, fillers, pigments, and thixotropic agents, as well as combinations of the foregoing.

In one preferred non-limiting embodiment, the first component or first portion of the adhesive composition described herein comprises 4 mole ethoxylated bisphenol A dimethacrylate, 2-(acetoacetoxy)ethyl methacylate, methacryloxypropyl trimethoxysilane; and at least one diluent monomer, and the second component or second portion comprises dibenzoyl peroxide. According to another non-limiting embodiment, a first portion of the adhesive compositions presented and described herein additionally comprises the reactive diluent monomers tetrahydrofurfuryl methacrylate and trimethylolpropane trimethacrylate. According to yet another non-limiting embodiment, the second portion comprises a phthalate-free dibenzoyl peroxide composition.

Delivery Method

Many methods of delivery for adhesive compositions may be contemplated. For instance, adhesive compositions may be stored in relatively small amounts in multi-chambered cartridges from which adhesive portions are simultaneously dispensed. Mixing may take place manually or through a static mixing nozzle. Alternately, the portions may be stored separately in large containers and mixed with mechanical dispensers just prior to use. Often, the selection of reactive resin and any diluent monomers may need to reflect the delivery method or tool that will be used to introduce the adhesive into a substrate. Dispensing with manual tools presents challenges, especially for low temperature cure adhesives. It is therefore desirable that the viscosities of such adhesive formulations can be adjusted in order to enable the end user to easily install the adhesive under low temperature conditions. In general, low viscosity reactive resins are preferred for such applications. However, low viscosity can also be achieved through a combination of choice of reactive resin, choice and amount of diluent monomer, choice and amount of filler, and choice and amount of thixotrope. Accordingly, and as will be understood by those skilled in the relevant art, the ingredients of the non-limiting embodiments presented herein may be formulated over a wide range in order to meet a variety of viscosity criteria from water-thin to thick paste.

Without limiting the scope of the instant disclosure, according to one non-limiting embodiment, a delivery method for the adhesive compositions presented and described herein comprises using a dual chamber cartridge to dispense the composition through a static mixing nozzle using a dispensing tool. The dispensing tool can be of any power configuration including, but not limited to manual, electric, battery operated or pneumatic. In one non-limiting embodiment, first and second portions of the adhesive compositions according to the instant disclosure are each prepared separately and then combined by mixing their ingredients in a large mechanical mixer. In one non-limiting embodiment, the portions are placed in separated multi-component, side-by-side or coaxial adhesive cartridges for use in the field where they are dispensed through a static mixing nozzle using a dispensing tool.

An alternate delivery method for an adhesive composition prepared according to the present disclosure may involve delivering the two separate portions in the field using dual tank bulk dispensing equipment. Yet another delivery method for an adhesive composition according to the present disclosure would involve the use of frangible capsules. Thus a first, sealed capsule containing a first component or first portion of the non-limiting formulations presented herein may be situated inside a second, larger capsule. The second capsule also contains the second component or second portion of the formulation and is also sealed. In the field, such a dual capsule would be placed into a borehole and broken by either driving an anchor element through the dual capsule or spinning the anchor element into the dual capsule. In such a frangible capsule delivery system, the dual capsules become part of the adhesive and serve as a filler.

Non-limiting embodiments of adhesive compositions of the instant disclosure may be provided or made available as part of a kit. A kit as contemplated herein contains a monomer or first portion that is maintained separately from an initiator or second portion. A kit may also include additional items such as instructions. Accordingly, a kit may comprise a multi-chambered cartridge from which components can be dispensed simultaneously, along with instructions for using or applying the adhesive compositions. Another form of a kit according to the instant disclosure may include one portion of an adhesive contained in a frangible capsule that is situated within a larger capsule that contains a second portion of the adhesive. The kit may also include instructions concerning use of the frangible capsule as a filler in applying the adhesive composition. Additional items, such as mixing sticks or paddles, gloves, nozzles, etc., may also be contemplated for use with kits that include the adhesive compositions described herein. The foregoing examples are not exhaustive. They are provided for illustrative purposes only, and are not intended to limit the scope of the present disclosure in any way.

Regardless of the delivery technique employed, according to one non-limiting embodiment of the instant disclosure, the first and second portions are provided and mixed in amounts such that the volume ratio of the first portion to the second portion is approximately ten to one. In another non-limiting embodiment, the first portion makes up approximately 91% of the total composition and the second portion makes up approximately 9% of the total composition.

In one aspect, the formulations of the present disclosure improve upon adhesives of the prior art by providing an adhesive formulation that has high internal mechanical strength, high bond strength with the base and the anchor, absorbs little water, has low toxicity, a viscosity appropriate for filling bore holes, and at the same is suitable for curing at low temperatures. In another aspect, the formulations of the present disclosure, when applied and cured at low temperature, exhibit strength and durability characteristics at both room temperatures and elevated temperatures that are at least equivalent to adhesives that are currently commercially available. That is, equivalent strength and durability characteristics of the instant formulations can be realized both at room temperatures and elevated temperatures as compared to commercially available adhesives, without the need for formulating compositions differently for use at different temperatures. Moreover, the adhesive compositions presented and discussed herein provide the added advantage that they are phthalate free.

The present disclosure includes detailed descriptions of certain embodiments as well as additional information in the form of Tables and Examples. Any specific embodiments should not be construed as narrowing the scope of the disclosure, but rather as illustrative examples. Although preferred embodiments of the disclosure are specifically described above, it is to be understood that various modifications and substitutions are anticipated and may be made to the described compositions, as well as to materials, methods of manufacture and use, without departing from the broad spirit or scope of the embodiments contemplated herein. Various examples of non-limiting embodiments of the instant disclosure are further provided and described in the claims, which follow.

What is claimed:

1. An improved curable adhesive composition, comprising:
    a. at least one reactive resin comprising a polymerizable monomer;
    b. at least one acetoacetoxy functional monomer;
    c. at least one silane monomer;
    d. a free radical initiator; and
    e. an accelerant;
    in which the free radical initiator comprises dibenzoyl peroxide and at least one additional component selected from among anti-oxidants, stabilizers, non-reactive diluents, plasticizers, and combinations of any of the foregoing; and the accelerant is selected from the group consisting of N,N-diisopropanol-p-toluidine, N,N-dihydroxyethyl-p-toluidine, N,N-methylhydroxyethyl-p-toluidine, and mixtures thereof.

2. the adhesive composition of claim 1, wherein the strength of the adhesive at 23° C. after cure at −10° C. compared to the strength of the adhesive at 23° C. after cure at 23° C. is greater than 50%, preferably greater than 60%, more preferably greater than 70% and most preferably greater than 80%.

3. The adhesive composition of claim 1 having a first shelf life before cure, wherein the first shelf life is greater than a second shelf life before cure of a comparable curable adhesive composition that does not include the non-reactive diluent, the plasticizer or both the non-reactive diluent and plasticizer.

4. The adhesive composition of claim 3, wherein the first shelf life is at least twice as long as the second shelf-life.

5. The adhesive composition of claim 3, wherein the first shelf life is at least three times as long as the second shelf life.

6. The adhesive composition of claim 1, wherein after curing at −10° C., the adhesive exhibits a and strength at 23° C. that is greater than 10 Mpa, preferably greater than 12 MPa, more preferably greater than 14 MPa and most preferably greater than 16 MPa.

7. The adhesive composition of claim 1, wherein:
    a. the reactive resin is selected from the group consisting essentially of: acrylate monomers, allylic resins, bismaleimide resins, epoxy acrylate resins, epoxy methacrylate resins, methacrylate monomers, phenolie-based acrylates, phenolic-based methacrylates, unsaturated polyester resins, urethane acrylate resins, urethane methacrylate resins, vinyl ester resins, and combinations of any of the foregoing;
    b. the acetoacetoxy functional monomer is selected from the group consisting essentially of: acetoacetoxyethyl acrylate, acetoacetoxyethyl methacrylate, diacetone acrylamide, acetoacetoxy vinyl ether, and combinations of any of the foregoing; and
    c. the silane monomer is selected from the group consisting essentially of methacryloxypropyl trimethoxysilane, methacryloxypropylmethyl dimethoxy silane, methacryloxypropyl triethoxy silane, acryloxypropyl trimetboxy silane, acryloxypropylmethyl dimethoxy silane, acryloxypropyl triethoxy silane, vinyl trimethoxysilane, vinylmethyl dimethoxy silane, vinyl triethoxy silane, and combinations of any of the foregoing.

8. The adhesive composition of claim 1, further comprising:
f. at least one reactive diluent monomer, where the diluent monomer is selected form among: monofunctional monomers, multifunctional monomers, and combinations of the foregoing; where:
1) the monofunctional monomer is selected from among: methacrylic acid, methyl methacrylate, isopropyl methacrylate, isobutyl methacrylate, tert-butyl methacrylate, n-butyl methacrylate, 2-ethylhexyl methacrylate, caprolactone methacrylate, steryl methacrylate, 2-phenoxyethyl methacrylate, tetrahydrofurfuryl methacrylate, glycidyl methacrylate, isobornyl methacrylate, by hydroxyethyl methacrylate, phosphate esters of hydroxyethyl methacrylate, hydroxypropyl methacrylate, hydroxybutyl methacrylate, benzyl methacrylate, dicyclopentyl methacrylate, tert-butyl acrylate, tert-butylaminoethyl methacrylate, acrylic acid, beta-carboxyethyl acrylate, tert-butyl acrylate, n-butyl acrylate, 2-ethylhexyl acrylate, caprolactone acrylate, steryl acrylate, 2-phenoxyethyl acrylate, tetrahydrofurfuryl acrylate, isobornyl acrylate, hydroxybutyl acrylate, benzyl acrylate, dicyclopentyl acrylate, dicyclopentadienyl acrylate, cyclic trimethanolpropane formal acrylate, trimethylcyclohexane acrylate, styrene, vinyl toluene, methyl styrene, t-butyl styrene, divinyl benzene, hydroxyl butyl vinyl ether, butanediol divinyl ether, triethylene glycol divinyl ether, N-vinyl pyrolidinone, allyl methacrylate, diallyl phthalate, allyloxypropartediol hydroxypolyethoxymonoallylic ether, allyl cinnimate, allyl glycidyl ether, maleic acid, maleic anhydride, dimethyl maleate, dibutyl maleate, dioxtyl maleate, dodecyl mercaptan, mercaptoethanol, mercaptopropionic acid, acrylamide, metnacrylamide, N-methylol acrylamide N-methylol methacrylamide, as well as combinations of any of the foregoing; and
2) the multifunctional monomer is selected from among: divinyl benzene, ally methacrylate, allyl cinnimate, ethylene glycol dimethacrylate, diethlyene glycol dimethacrylate, triethylene glycol dimethacrylate, dipropylene glycol dimethacrylate, 1,3-butylene glycol dimethacrylate, 1,4-butanediol dimethacrylate, 1,6-hexanediol dimethacrylate, neopentyl glycol dimethacrylate, cyclohexane dimethanol dimethacrylate, dicyclopentyl dimethacrylate, dicyclopentadienyl dimethacrylate, glyceryl trimethacrylate, trimethylolpropane, trimethacrylate, pentaerythritol trimethacrylate, pentaerythritol tetramethacrylate, dipentaerythritol pentamethacrylate, ethylene glycol diacrylate, diethlyene glycol diacrylate, triethylene glycol diacrylate, dipropylene glycol diacrylate, 1,3-butylene glycol diacrylate, 1,4-butanediol diacrylate, 1,6-hexanediol diacrylate, neopentyl glycol diacrylate, cyclohexane dimethanol diacrylate, dicyclopentyl diacrylate, dicyclopentadienyl acrylate, glyceryl triacrylate, trimethylolpropane triacrylate, pentaerythritol triacrylate, pentaerythritol tetraacrylate, dipentaerythritol pentaacrylate, tris(2-hydroxy ethyl) isocyanurate triacrylate, alkoxylated versions of any of the foregoing, and metallic acrylates and methacrylates of zinc, magnesium and calcium as well as combinations of any of the foregoing.

9. The adhesive composition of claim 1, wherein the polymerizable monomer is an ethoxylated bisphenol A dimethacrylate.

10. The adhesive composition of claim 1, wherein the acetoacetoxy functional monomer is acetoacetoxyethyl methacrylate.

11. The adhesive composition of claim 1, wherein the silane monomer is methacryloxypropyl trimethoxysilane.

12. The adhesive composition of claim 1, wherein the dibenzoyl peroxide is phthalate-free.

13. The adhesive composition of claim 1, wherein the polymerizable monomer is an ethoxylated bisphenol A dimethacrylate; the acetoacetoxy functional monomer is acetoacetoxyethyl methacrylate; the silane monomer is methacryloxypropyl trimethoxysilane; the dibenzoyl peroxide is phthalate-free; and the accelerant is selected from the group consisting of: N,N-diisopropanol-p-toluidine, N,N-dihydroxyethyl-p-toluidine, N,N-methylhydroxyethyl-p-toluldine, and mixtures thereof.

14. A curable adhesive adhesive composition, comprising:
a. at least one reactive resin comprising a polymerizable monomer;
b. at least one acetoacetoxy functional monomer;
c. at least one silane monomer;
d. a free radical initiator; and
e. an accelerant;
wherein: the polymerizable monomer is an ethoxylated bisphenol A dimethacrylate; the acetoacetoxy functional monomer is acetoacetoxyethyl methacrylate; the silane monomer is methacryloxypropyl trimethoxysilane; the free radical initiator comprises phthalate-free dibenzoyl peroxide and at least one additional component selected from among anti-oxidants, stabilizers, non-reactive diluents, plasticizers, and combinations of any of the foregoing; and the accelerant is selected from the group consisting of N,N-diisopropanol-p-toluidine, N,N-dihydroxyethyl-p-toluidine, N,N-methylhydroxyethyl-p-toluidine, and mixtures thereof.

15. A curable adhesive composition, comprising:
a. an ethoxylated bisphenol A dimethacrylate;
b. acetoacetoxyethyl methacrylate;
c. methacryloxypropyl trimethoxysilane;
d. phthalate-free dibenzoyl peroxide and at least one additional component selected from among anti-oxidants, stabilizers, non-reactive diluents, plasticizers, and combinations of any of the foregoing; and
e. an accelerant selected from the group consisting of N,N-diisopropanol-p-toluidine, N,N-dihydroxyethyl-p-toluidine, N,N-methylhydroxyethyl-p-toluidine, and mixtures thereof.

16. A curable adhesive composition, comprising:
a. an ethoxylated bisphenol A dimethacrylate;
b. acetoacetoxyethyl methacrylate;
c. methactyloxypropyl trimethoxysilane;
d. phthalate-free dibenzoyl peroxide and at least one additional component selected from among anti-oxidants, stabilizers, non-reactive diluents, plasticizers, and combinations of any of the foregoing; and
e. N,N-diisopropanol-p-toluidine.

17. A method for manufacturing an adhesive composition, comprising:
a. presenting a first portion, the first portion comprising:
1) at least one reactive resin comprising a functional monomer;
2) at least one acetoacetoxy functional monomer;

3) at least one silane monomer; and
4) at least one accelerant;
b. presenting a separately arranged second portion, the second portion comprising:
5) a free radical initiator; and
c. combining the first portion with the second portion;
wherein the free radical initiator comprises dibenzoyl peroxide and at least one additional component selected from among anti-oxidants, stabilizers, non-reactive diluents, plasticizers, and combinations of any of the foregoing and the accelerant is selected from the group consisting of N,N-diisopropanol-p-toluidine, N,N-dihydroxyethyl-p-toluidine, N,N-methylhydroxyethyl-p-toluidine and mixtures thereof.

18. The method of claim 17, wherein the reactive resin is selected from the group consisting of an acrylate monomer, an allylic resin, a bismaleimide resin, an epoxy acrylate resin, an epoxy methacrylate resin, a methacrylate monomer, a phenolic-based acrylate, a phenolic-based methacrylate, an unsaturated polyester resin, a urethane acrylate resin, a urethane methacrylate resin, a vinyl ester resin, and combinations of any of the foregoing.

19. The method of claim 17, wherein the acetoacetoxy functional monomer is selected from the group consisting of an acetoacetoxyethyl acre late, an acetoacetoxyethyl methacrylate, a diacetone acrylamide, an acetoacetoxy vinyl ether, and combinations of any of the foregoing.

20. The method of claim 17, wherein the silane monomer is selected from the group consisting, of a methacryloxypropyl trimethoxysilane, a methacryloxypropylmethyl dimethoxy silane, a methacryloxypropyl triethoxy silane, an acryloxypropyl trimethoxy silane, an acryloxypropylmethyl dimethoxy slime, an acryloxypropyl triethoxy silane, a vinyl trimethoxysilane, a vinylmethyl dimethoxy slime, a vinyl triethoxy silane, and combinations of any of the foregoing.

21. The method of claim 17, wherein the first portion further comprises:
6) at least one reactive diluent monomer selected form the group consisting of a monofunctional monomer, a multifunctional monomer, and combinations of the foregoing, wherein
i) the monofunctional monomer is selected from among: methacrylic acid, methyl methacrylate, isopropyl methacrylate, isobutyl methacrylate, tert-butyl methacrylate, n-butyl methacrylate, 2-ethylhexyl methacrylate, caprolactone methacrylate, steel methacrylate, 2-phenoxyethyl methacrylate, tetrahydrofurfuryl methacrylate, glycidyl methacrylate, isobornyl methacrylate, hydroxyethyl methacrylate, phosphate esters of hydroxyethyl methacrylate, hydroxypropyl methacrylate, hydroxybutyl methacrylate, benzyl methacrylate, dicyclopentyl methacrylate, tert-butyl acrylate, tert-butylaminoethyl methacrylate, acrylic acid, beta-carboxyethyl acrylate, tert-butyl acrylate, n-butyl acrylate, 2-ethylhexyl acrylate, caprolactone acrylate, steryl acrylate, 2-phenoxyethyl acrylate, tetrahydrofurfuryl acrylate, isobornyl acrylate, hydroxybutyl acrylate, benzyl acrylate, dicyclopentyl acrylate, dicyclopentadienyl acrylate, cyclic trimethanolpropane formal acrylate, trimethylcyclohexane acrylate, styrene, vinyl toluene, methyl styrene, t-butyl styrene, divinyl benzene, hydroxyl butyl vinyl ether, butanediol divinyl ether, triethylene glycol divinyl ether, N-vinyl pyrolidinone, allyl methacrylate, diallyl phthalate, allyloxypropanediol hydroxypolyethoxymonoallylic ether, allyl cinnimate, ally glycidyl ether, maleic acid, maleic anhydride, dimethyl maleate, dibutyl maleate, dioxtyl maleate, dodecyl mercaptan, mercaptoethanol, mercaptopropionic acid, acrylamide, methacrylamide, N-methylol acrylamide, N-methylol methacrylamide, as well as combinations of any of the foregoing; and
ii) the multifunctional monomer is selected from among: divinyl benzene, allyl methacrylate, allyl cinnimate, ethylene glycol dimethacrylate, diethlyene glycol dimethacrylate, triethylene glycol dimethacrylate, dipropylene propylene glycol dimethacrylate, 1,3-butylene glycol dimethacrylate, 1,4-butanediol dimethacrylate, 1,6-hexanediol dimethacrylate, neopentyl glycol dimethacrylate, cyclohexane dimethanol dimethacrylate, dicyclopentyl dimethacrylate, dicyclopentadienyl dimethacrylate, glyceryl trimethacrylate, trimethylolpropane trimethacrylate, pentaerythritol trimethacrylate, pentaerythritol tetramethacrylate, dipentaerythritol pentamethacrylate, ethylene glycol diacrylate, diethlyene glycol diacrylate, triethylene glycol diacrylate, dipropylene glycol diacrylate, 1,3-butylene glycol diacrylate, 1,4-butanediol diacrylate, 1,6-hexanediol diacrylate, neopentyl glycol diacrylate, cyclohexane dimethanol diacrylate, dicyclopentyl diacrylate, dicyclopentadienyl acrylate, glyceryl triacrylate, trimethylolpropane triacrylate, pentaerythritol triacrylate, pentaerythritol tetraacrylate, dipentaerythritol pentaacrylate, tris(2-hydroxy ethyl)isocyanurate triacrylate, alkoxylated versions of any of the foregoing, and metallic acrylates and methacrylates of zinc, magnesium and calcium as well as combinations of any of the foregoing.

22. The method of claim 17, wherein the polymerizable monomer is an ethoxylated bisphenol A dimethacrylate.

23. The method of claim 17, wherein the acetoacetoxy functional monomer is acetoacetoxyethyl methacrylate.

24. The method of claim 17, wherein the silane monomer is methacyloxypropyl trimethoxysilane.

25. The method of claim 17, wherein the dibenzoyl peroxide is phthalate-free.

26. The method of claim 17, wherein the wherein the polymerizable monomer is an ethoxylated bisphenol A dimethacrylate, the acetoacetoxy functional monomer is acetoacetoxyethyl methacrylate, the silane monomer is methacryloxypropyl trimethoxysilane, the accelerant is selected from the group consisting, of N,N-diisopropanol-p-toluidine, N,N-dihydroxyethyl-p-toluidine, N,N-methylhydroxyethyl-p-toluidine, and combinations thereof, and the dibenzoyl peroxide is phthalate-free.

27. A method for anchoring an element in a structural body, comprising:
a. providing a first portion, the first portion comprising:
1) an ethoxylated bisphenol A dimethacrylate;
2) acetoacetoxyethyl methacrylate;
3) methacryloxypropyl trimethoxysilane; and
4) an accelerant selected from the group consisting of N,N-diisopropanol-p-toluidine, N,N-dihydroxyethyl-p-toluidine, N,N-methylhydroxyethyl-p-toluidine, and combinations thereof;
b. providing a separately arranged second portion, the second portion comprising:
5) phthalate-free dibenzoyl peroxide and at least one additional component selected from among anti-oxidants, stabilizers, non-reactive diluents, plasticizers, and combinations of any of the foregoing;
c. combining the first portion with the second portion forming an adhesive composition; and d. anchoring the element in the structural body using the adhesive composition.

28. The method of claim 27, wherein the element is selected from the group comprising a metallic object, a steel rod, a steel bolt, a ceramic member, a concrete member, a masonry member, a plastic member, a glass member, a wood member, and combinations thereof.

29. The method of claim 27, wherein the structural body is selected form the group comprising concrete, masonry and combinations thereof.

30. The method of claim 27, the first portion further comprising:
6) at least one reactive diluent monomer selected form the group consisting of a monofunctional monomer, a multifunctional monomer, and combinations of the foregoing, wherein
    i) the monofunctional monomer is selected from among: methacrylic acid, methyl methacrylate, isopropyl methacrylate, isobutyl methacrylate, tert-butyl methacrylate, n-butyl methacrylate, 2-ethylhexyl methacrylate, caprolactone methacrylate, steryl methacrylate, 2-phenoxyethyl methacrylate, tetrahydrofurfuryl methacrylate, glycidyl methacrylate, isobornyl methacrylate, hydroxyethyl methacrylate, phosphate esters of hydroxyethyl methacrylate, hydroxypropyl methacrylate, hydroxybutyl methacrylate, benzyl methacrylate, dicyclopentyl methacrylate, tert-butyl acrylate, tert-butylaminoethyl methacrylate, acrylic acid, beta-carboxyethyl acrylate, ten-butyl acrylate-butyl acrylate, 2-ethylhexyl acrylate, caprolactone acrylate, steryl acrylate, 2-phenoxyethyl acrylate, tetrahydrofurfuryl acrylate, isobornyl acrylate, hydroxybutyl acrylate, benzyl acrylate, dicyclopentyl acrylate, dicyclopentadienyl acrylate, cyclic trimethanolpropane formal acrylate trimethylcyclohexane acrylate, styrene, vinyl toluene, methyl styrene, t-butyl styrene, divinyl benzene, hydroxyl butyl vinyl ether, butanediol divinyl ether, triethylene glycol divinyl ether, N-vinyl pyrolidinone, allyl methacrylate, diallyl phthalate, allyloxypropanediol hydroxypolyethoxymonoallylic ether, allyl cinnimate, allyl glycidyl ether, maleic acid, maleic anhydride, dimethyl maleate, dibutyl maleate, dioxtyl maleate, dodecyl mercaptan, mercaptoethanol, mercaptopropionic acid, acrylamide, methacrylamide, N-methylol acrylamide, N-methylol methacrylamide, as well as combinations of any of the foregoing; and
    ii) the multifunctional monomer is selected from among: divinyl benzene, allyl methacrylate, allyl cinnimate, ethylene glycol dimethacrylate, diethlyene glycol dimethacrylate, triethylene glycol dimethacrylate, dipropylene glycol dimethacrylate, 1,3-butylene glycol dimethacrylate, 1,4-butanediol dimethacrylate, 1,6-hexanediol dimethacrylate, neopentyl glycol dimethacrylate, cyclohexane dimethanol dimethacrylate, dicyclopentyl dimethacrylate, dicyclopentadienyl dimethacrylate, glyceryl trimethacrylate, trimethylolpropane trimethacrylate, pentaerythritol trimethacrylate, pentaerythritol tetramethacrylate, dipentaerythritol pentamethacrylate, ethylene glycol diacrylate, diethlyene glycol diacrylate, triethylene glycol diacrylate, dipropylene glycol diacrylate, 1,3-butylene glycol diacrylate, 1,4-butanediol diacrylate, 1,6-hexanediol diacrylate, neopentyl glycol diacrylate, cyclohexane dimethanol diacrylate, dicyclopentyl diacrylate, dicyclopentadienyl acrylate, glyceryl triacrylate, trimethylolpropane triacrylate, pentaerythritol triacrylate, pentaerythritol tetraacrylate, dipentaerythritol pentaacrylate, tris(2-hydroxy ethyl) isocyanurate triacrylate, alkoxylated versions of any of the foregoing, and metallic acrylates and methacrylates of zinc, magnesium and calcium as well as combinations of any of the foregoing.

31. A method for anchoring an element in a structural body, comprising:
a. providing a first portion, the first portion comprising:
    1) an ethoxylated bisphenol A dimethacrylate;
    2) acetoacetoxyethyl methacrylate;
    3) methacryloxypropyl trimethoxysilane; and
    4) phthalate-free dibenzoyl peroxide and at least one additional component selected from among anti-oxidants, stabilizers, non-reactive diluents, plasticizers, and combinations of any of the foregoing; and
b. providing a separately arranged second portion, the second portion comprising:
    5) N,N-diisopropanol-p-toluidine;
c. combining the first portion with the second portion producing an adhesive composition; and
d. anchoring the element in the structural body using the adhesive composition.

32. A kit for an adhesive composition, comprising:
a. a first portion having:
    1) at least one reactive resin comprising a functional monomer,
    2) at least one acetoacetoxy functional monomer;
    3) at least one silane monomer: and
    4) at least one accelerant selected from the group consisting of N,N-diisopropanol-p-toluidine, N,N-dihydroxyethyl-p-toluidine, N,N-methylhydroxyethyl-p-toluidine, and combinations thereof;
b. a separately-maintained second portion comprising:
    5) dibenzoyl peroxide and at least one additional component selected from among anti-oxidants, stabilizers, non-reactive diluents, plasticizers, and combinations of any of the foregoing; and
c. instructions for use.

33. The kit of claim 32, the first portion further comprising:
6) at least one reactive diluent monomer selected form the group consisting of a monofunctional monomer, a multifunctional monomer, and combinations of the foregoing, wherein
    i) the monofunctional monomer is selected from among: methacrylic acid, methyl methacrylate, isopropyl methacrylate, isobutyl methacrylate, tert-butyl methacrylate, n-butyl methacrylate, 2-ethylhexyl methacrylate, caprolactone methacrylate, steryl methacrylate, 2-phenoxyethyl methacrylate, tetrahydrofurfuryl methacrylate, glycidyl methacrylate, isobornyl methacrylate, hydroxyethyl methacrylate, phosphate esters of hydroxyethyl methacrylate, hydroxypropyl methacrylate, hydroxybutyl methacrylate, benzyl methacrylate, dicyclopentyl methacrylate, tert-butyl acrylate, tort-butylaminoethyl methacrylate, acrylic acid, beta-carboxyethyl acrylate, tert-butyl acrylate, n-butyl acrylate, 2-ethylhexyl acrylate caprolactone acrylate, steryl acrylate, 2-phenoxyethyl acrylate, tetrahydrofurfuryl acrylate, isobornyl acrylate, hydroxybutyl acrylate, benzyl acrylate, dicyclopentyl acrylate, dicyclopentadienyl acrylate, cyclic trimethanolpropane formal acrylate, trimethylcyclohexane acrylate, styrene, vinyl toluene, methyl styrene, t-butyl styrene, divinyl benzene, hydroxyl butyl vinyl ether, butanediol divinyl ether, triethylene glycol divinyl ether, N-vinyl pyrolidinone, allyl methacrylate, diallyl phthalate, allyloxypropanediol hydroxypolyethoxymonoallylic ether, allyl cinnimate, allyl glycidyl ether, maleic acid, maleic anhydride, dimethyl maleate, &butyl maleate, dioxtyl maleate, dodecyl mercaptan, mercaptoethanol, mercaptopropionic acid, acrylamide, methacrylamide, N-methylol acrylamide, N-methylol methacrylamide, as well as combinations of any of the foregoing; and ii) the multifunctional monomer is selected from among: divinyl benzene, allyl methacrylate, allyl cinnimate, ethylene glycol dimethacrylate, diethlyene glycol dimethacrylate, triethylene glycol dimethacrylate, dipropylene glycol dimethacrylate, 1,3-butylene glycol dimethacrylate, 1,4-butanediol dimethacrylate, 1,6-hexanediol dimethacrylate, neopentyl glycol dimethacrylate, cyclohexane dimethanol dimethacrylate, dicyclopentyl dimethacrylate, dicyclopentadienyl dimethacrylate, glyceryl trimethacrylate, trimethylolpropane trimethacrylate, pentaerythritol trimethacrylate, pentaerythritol tetramethacrylate, dipentaerythritol pentamethacrylate, ethylene glycol diacrylate, diethlyene glycol diacrylate, triethylene glycol diacrylate, dipropylene glycol diacrylate, 1,3-butylene glycol diacrylate, 1,4-butanediol diacrylate, 1,6-hexanediol diacrylate, neopentyl glycol diacrylate, cyclohexane dimethanol diacrylate, dicyclopentyl diacrylate, dicyclopentadienyl acrylate, glyceryl triacrylate, trimethylolpropane triacrylate, pentaerythritol triacrylate, pentaerythritol tetraacrylate, dipentaerythritol pentaacrylate, tris(2-hydroxy ethyl) isocyanurate triacrylate, alkoxylated versions of any of the foregoing, and metallic acrylates and methacrylates of zinc, magnesium and calcium as well as combinations of any of the foregoing.

34. The kit of claim 32, wherein the first portion is contained in a first chamber and the second portion is contained in a second chamber, both of the chambers configured in an arrangement selected from the group consisting of co-axial, side-by-side, bulk tank equipment, and combinations of any of the forgoing.

35. The kit of claim 34, wherein at least one chamber is frangible.

36. The kit of claim 35, wherein the frangible chamber serves as a filler.

37. The method of claim 27, wherein the first portion and second portion are combined through a static mixing nozzle.

38. The method of claim 27, wherein the amount of the first portion is in the range of about 30% to about 70%.

39. he method of claim 27, wherein the amount of the second portion is in the range of about 10% to 25%.

40. The method of claim 27, wherein the ratio of the first portion to the second portion is about 10:1 (% weight).

41. The kit of claim 32, wherein the amount of the first portion is in the range of about 30% to about 70%.

42. The kit of claim 32, wherein the amount of the second portion is in the range of about 10% to 25%.

43. The kit of claim 32, wherein the ratio of the first portion to the second portion is about 10:1 (% weight).

* * * * *